May 6, 1924.  
D. J. SCAFE  
HOOK  
Filed April 6, 1923  
1,493,285

INVENTOR  
DONALD JOHN SCAFE  
BY  
Fetherstonhaugh & Co  
ATTORNEYS

Patented May 6, 1924.

1,493,285

UNITED STATES PATENT OFFICE.

DONALD JOHN SCAFE, OF VICTORIA, BRITISH COLUMBIA, CANADA.

HOOK.

Application filed April 6, 1923. Serial No. 630,379.

*To all whom it may concern:*

Be it known that I, DONALD JOHN SCAFE, a subject of the King of Great Britain, and a resident of the city of Victoria, in the Province of British Columbia, Canada, have invented certain new and useful Improvements in Hooks, of which the following is a specification.

My invention relates to improvements in hooks, the objects of which are to provide in a hook means whereby the hook can be readily disconnected from the end of a cable to which it is fitted when desired, and which provides for a free swivelling movement of the hook upon the cable, and for providing a means whereby the hook cannot become dislodged from its cable inadvertently either when a load is upon the hook or when the hook is free from load, and which consists essentially of a hook having a slotted back in which a passage is provided for the insertion of the thimbled end of a cable such passage terminating in an eye for the reception of the cable end when in working position, as will be more fully shown in the following specification.

In the drawings like characters of reference indicate corresponding parts in each figure.

Figure 1:
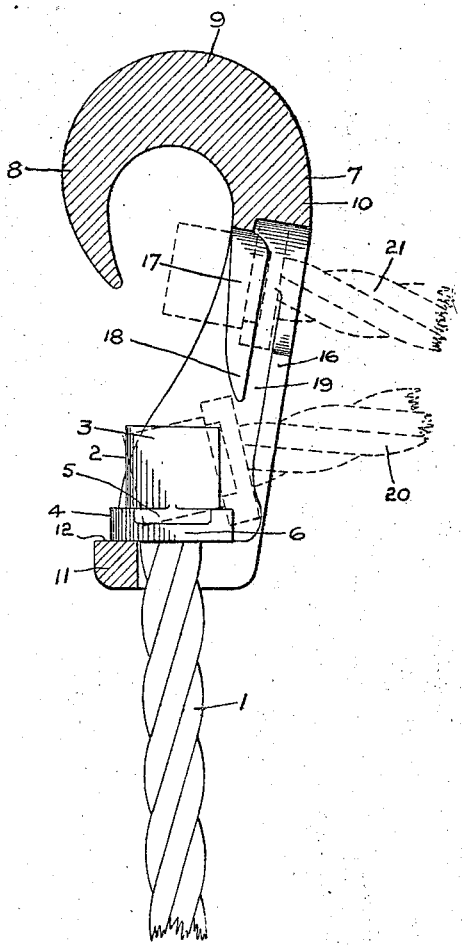
Fig. 1 is a vertical sectional view of my invention taken on the line 1—1 of Fig. 2.
Figure 2:
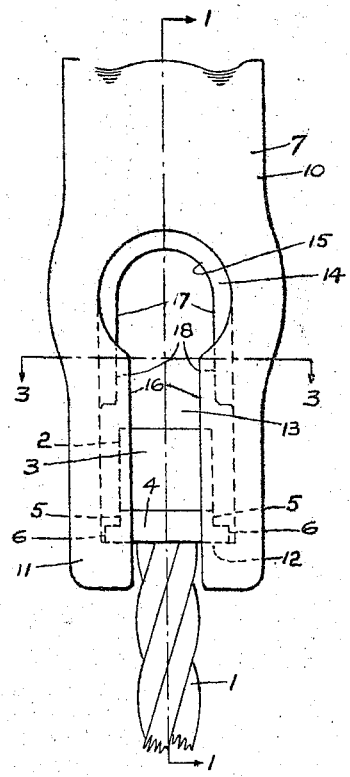
Fig. 2 is a view of the back of my hook.
Figure 3:
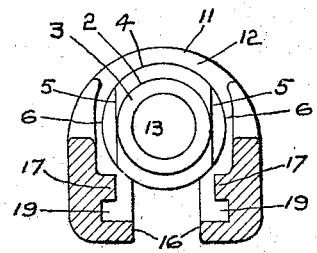
Fig. 3 is a sectional view looking down, taken on the line 3—3 of Fig. 2.

The numeral 1 indicates a cable to the end of which a thimble generally indicated by the numeral 2 is attached. 3 is the thimble body, 4 is an annular shoulder surrounding the base of the thimble, which is provided with a pair of oppositely disposed flattened surfaces 5 of similar width to the body 3 leaving upon the shoulder 4 a pair of segmental portions 6 which are equal in vertical height to the width of the grooves 19.

The numeral 7 indicates generally my hook in which 8 is the bill, 9 the bight, 10 the shank and 11 is the swivel eye having a seat 12 on which the thimble 2 normally rests. 13 indicates an elongated slot extending lengthwise of the shank 10 from the eye 11 and terminating at the upper end in a circular aperture 14 which aperture is of a diameter equal to the annular shoulder 4 of the thimble 2 for a portion of its length through the shank and is reduced to a diameter equal to that of the thimble body 3 adjacent the inner face of the shank, as indicated by the numeral 15.

The numeral 16 indicates a pair of oppositely disposed flanges in the same plane as the back of the shank 10 which terminate at the upper end at the aperture 14 and at the lower at the eye portion 11. 17 indicates a further flange projecting inwardly of the aperture 14 adjacent the inner face of the shank 10 and extending downwards along the side of the shank, terminating in a pair of tapered portions 18.

The numeral 19 indicates a pair of grooves formed by the flanges 16 and 17 through which the segmental portions 6 of the thimble 2 must pass to permit the cable to be attached to or withdrawn from the hook. The numerals 20 and 21 indicate position assumable by the cable during the use of the hook, which will be explained hereinafter.

Having thus described the several parts of my invention I will now briefly explain the manner in which it will be attached to a cable.

To attach the hook to a cable end to which a thimble 2 has been fitted, it suffices to pass the thimble into the aperture 15 until the annular shoulder comes to rest in the aperture 14, see position 21, the cable is then turned until the segmental portions 6 of the shoulder are in line with the grooves 19 when the thimble may be slid downwards throughout the length of the slot 13, the cable being brought into position within the eye 11 in line with the axis of the hook, when the hook is ready for use and is free to swivel about the cable as required.

Should the hook, when being trailed through the woods and free from load, be unduly jerked from the normal working position it would most likely assume momentarily a position to the cable as shown by the numeral 20, when any further slippage of the hook with respect to the cable would cause the annular shoulder 4 of the thimble to pass freely inwards of the tapered extremities 18 of the flange 17 and at no time is there more than a possibility of the thimble assuming a position with respect to the grooves 19 which would permit the segmental portions 6 of the thimble to register accurately with the grooves to permit its inadvertent disengagement from the hook.

What I claim as my invention is:

1. In a hook having a cable eye at one end upon which a cable thimble is adapted to rest, opposing right angular disengaging passages formed in the hook between the eye and the point of disengagement, and means at diametrically opposite sides of the thimble for slidably entering the aforesaid passages.

2. In a hook having a cable eye at one end and having an aperture and a slot extending between the eye and the aperture, guideways formed on each side of the slot, and a thimble adapted to rest upon the eye of the hook to slidably engage the guides at diametrically opposite points to pass freely through the aperture at the opposite end of the slot.

3. In a cable hook, a hook shank having a recessed aperture therein, and a cable eye formed at the opposite end of the shank through which the cable normally extends, a curved slot extending between the eye and the aperture, and a thimble secured to the cable end having an enlargement normally resting upon the eye and formed at diametrically opposite points to enter the grooves of the slot so as to pass into the recessed aperture and outward through the same.

4. In a cable hook, a hook shank having a recessed aperture therein and an eye at the opposite end of the shank and a grooved slot extending between the eye and the aperture, a thimble carried by the cable having an annular enlargement normally resting upon the eye, and flattened portions located at diametrically opposite sides of such enlargement adapted to engage and enter the aforesaid grooved slot to pass to and through the recessed aperture.

Dated at Lime, Ore., U. S. A. this 19 day of Mar. 1923.

DONALD JOHN SCAFE.

Witnesses:
LAUCHLAN McLEAN,
JOHN McLEAN.